United States Patent [19]

Roller

[11] Patent Number: 4,979,596
[45] Date of Patent: Dec. 25, 1990

[54] SAFETY BRAKE SYSTEM FOR AN ENGINE
[75] Inventor: Lee E. Roller, West Bend, Wis.
[73] Assignee: Tecumseh Products Company, Tecumseh, Mich.
[21] Appl. No.: 371,724
[22] Filed: Jun. 27, 1989
[51] Int. Cl.$^5$ .............................................. F16D 59/02
[52] U.S. Cl. ...................................... 188/166; 56/10.5
[58] Field of Search ...................... 188/77 R, 166, 167; 56/10.5

[56] References Cited

U.S. PATENT DOCUMENTS

| | | | |
|---|---|---|---|
| 1,945,622 | 2/1934 | Sneed | 64/29 |
| 1,958,681 | 5/1934 | Sneed | 64/29 |
| 3,228,177 | 1/1966 | Coates | 188/166 X |
| 3,253,481 | 5/1966 | Warhol | 74/501 |
| 4,362,228 | 12/1982 | Plamper et al. | 192/0.094 |
| 4,419,857 | 12/1983 | Smith | 56/11.3 |
| 4,757,885 | 7/1988 | Kronich | 192/1.4 |
| 4,889,213 | 12/1989 | Roller | 188/166 X |

FOREIGN PATENT DOCUMENTS

| | | | |
|---|---|---|---|
| 51-042598 | 4/1951 | Japan . | |
| 0094035 | 7/1980 | Japan | 188/166 |

Primary Examiner—Duane A. Reger
Attorney, Agent, or Firm—Jeffers, Hoffman & Niewyk

[57] ABSTRACT

A safety brake system for a walk behind lawn mower in which provision is made for alternative orientations of the engine relative to the mower deck and operator's position while utilizing the same components for the safety brake system. Only the interconnection of the components is changed for the alternative engine orientations. In one configuration, a control lever connected intermediate an operator actuated bowden cable and the brake disengagement device is pivoted between the attachment points of the control lever to the bowden cable and the disengagement device such that a reverseal of direction of pull is effected. In the other configuration, the point of attachment of the control lever to the disengagement device is on the same side of the pivot point of attachment to the bowden cable such that no reversal of direction of pull occurs. The control lever is manufactured with both attachment points so that a bowden cable approaching the engine from the rear of the mower can by attached to one or the other to actuate the brake disengagement device regardless of the selected orientation of the engine.

15 Claims, 2 Drawing Sheets

U.S. Patent Dec. 25, 1990 Sheet 1 of 2 4,979,596
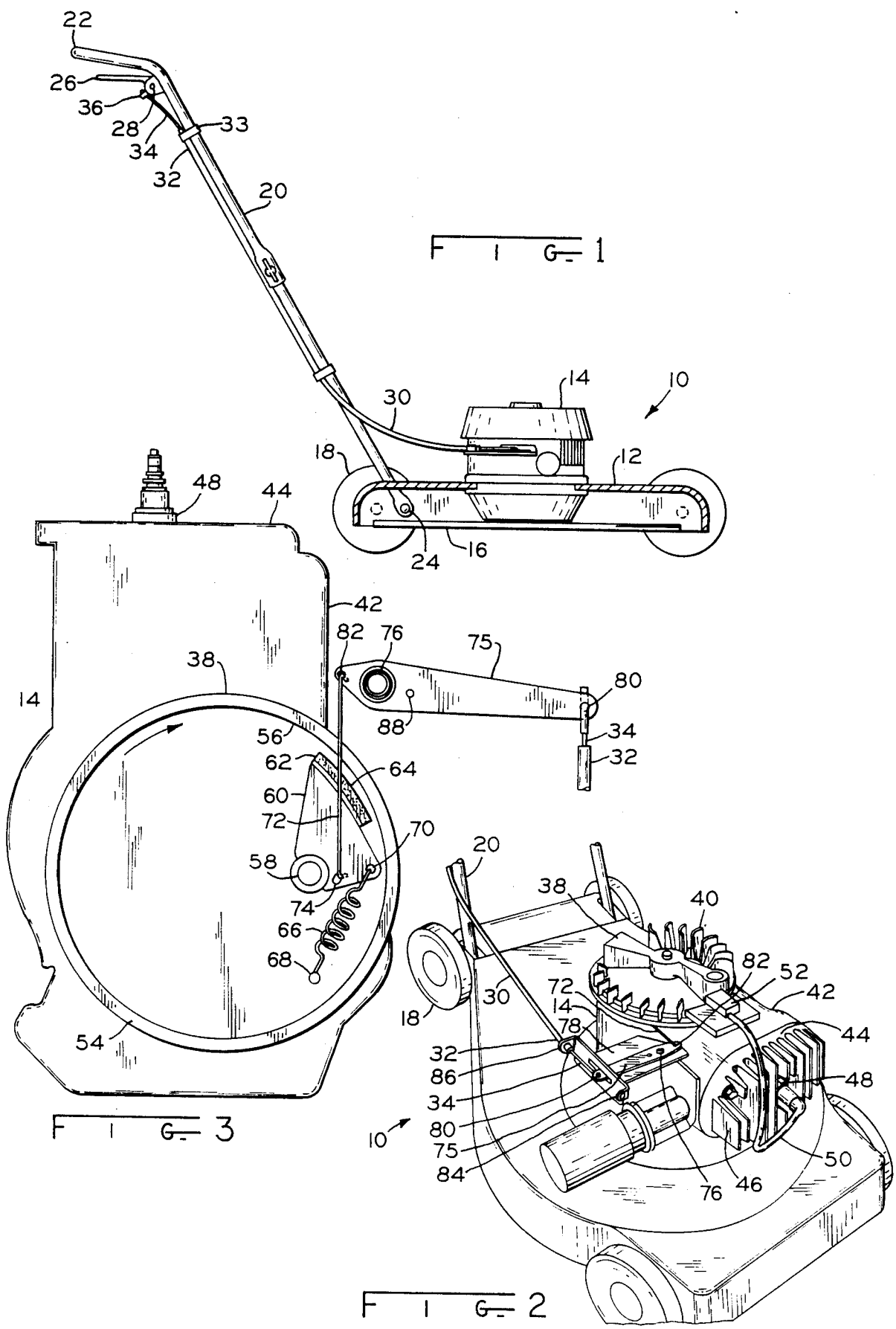

SAFETY BRAKE SYSTEM FOR AN ENGINE

BACKGROUND OF THE INVENTION

The present invention relates generally to safety devices for engine powered implements and more particularly to such safety devices which function to promptly stop the engine or moving parts in the event that the operator leaves the operating position (deadman safety devices).

Deadman safety devices which are used in conjunction with lawn mowers, snow blowers, garden tillers and other such power equipment having an engine which drives a potentially dangerous rotating implement often use a common interface with the operator, namely one in which the operator must continuously grip a bail handle or other lever against a spring force in order to maintain the equipment in its normal operational condition. Release of the bail handle results in the spring force initiating engagement of a safety mechanism which can include a brake and/or clutch to stop rotation of the engine, the rotating implement, or both. The electrical ignition system of the engine is also often defeated.

Because the spring force against which the bail handle or other deadman safety lever acts is relatively strong, a Bowden cable of the type in which the inner wire acts only in tension is most commonly employed for transmitting force from the safety lever to the safety mechanism. Consequently, regardless of the arrangement of the safety brake or clutch as it attaches to the engine, it is best actuated by a pulling movement of the inner wire of a Bowden cable relative to its sheath which is fixed to the engine or to some other structure fixed relative to the engine. Alternately, the inner wire of the Bowden cable could be fixed and the sheath could provide a pushing motive force, which would still allow the inner wire to be active in tension. This alternative is not satisfactory, however, since free movement of the sheath is liable to be impaired by interference from the engine, lawn mower handle, or other incidentally adjacent structure, thus degrading the reliability of the deadman safety device.

The most straightforward arrangement of a Bowden cable acting in tension when utilized on a walk behind implement is one in which the cable runs downwardly from the handle grip and approaches the engine from the rear of the implement. Thus, the cable is suited for exerting a rearward pulling force. It is easy enough to then provide suitable linkage to connect the Bowden cable to the device for disengaging the safety brake, assuming the orientation of the engine and its brake mechanism are known. However, manufacturers of lawn mowers sometimes prefer to orient the engine such that the cylinder faces forward and other times prefer to orient the engine such that the cylinder faces rearward. Since the linkage for disengaging the safety brake is associated with the engine itself, it would be desirable to provide such a linkage which could accommodate either orientation cf the engine as desired by the mower manufacturer and yet allow the connection to the Bowden cable to be a mere matter of alternative assembly without requiring parts changes. This present invention provides such a linkage arrangement.

SUMMARY OF THE INVENTION

A safety brake for an engine used with power implements involves a brake of the type which is spring biased into a braking condition unless continuously held in a disengaged state by the operator against the bias. A control lever has alternatively utilized attachment points for connection to the brake disengagement means such that a Bowden cable attached to the control lever and pulling rearward with respect to the implement is able to disengage the brake regardless of mounting orientation of the engine. On the control lever, one set of attachment points is used for engines mounted facing forward and another is used for engines mounted facing rearward.

It is an advantage of the present invention that a single engine and safety brake system can be used for different engine mounting orientations without requiring parts changes.

According to a further aspect of the invention, the control lever has a pivot attached to the engine intermediate the two ends of the control lever and two holes on either side of the pivot equidistant from the pivot. One end of the control lever is attached to the Bowden cable and the two holes are alternatively selectable for attachment of a link actuating the brake disengagement means. The hole on the opposite side of the pivot from the cable attachment point allows the control lever to reverse the direction of pull of the Bowden cable while the hole on the same side of the pivot as the cable attachment point allows the same direction of pull to prevail. The reversal or non-reversal of direction of pull is selected depending upon which orientation of the engine has been selected with respect to the mower deck and operator's position.

The invention, in one form thereof, provides a safety brake system for an engine including brake means normally biased in a braking condition for braking rotation of the engine and disengagement means connected to the brake means and responsive to externally applied force for disengaging the brake means from the braking condition. Also, operator interface means are provided for transmitting force from an operator to the disengagement means, the interface means including a pivoted control lever having first and second ends and a pivot located intermediate the first and second ends and an intermediate portion located intermediate the pivot and the second end, the control lever being connected to the disengagement means, and deadman means connected to the pivoted control lever and manually operable by the operator for transmitting force Lo the control lever when so operated. The interface means has alternatively selectable first and second conditions, where in the first condition has the first end of the control lever connected to the disengagement means and the second end of the control lever connected to the deadman means, such that force applied to the control lever through the deadman means undergoes a reversal of direction while being transmitted by the control lever to the disengagement means. The second condition has the intermediate portion of the control lever connected to the disengagement means and the second end of the control lever connected to the deadman means, such that force applied to the control lever through the deadman means does not undergo a reversal of direction while being transmitted by the control lever to the disengagement means.

It is an object of the present invention to provide an improved safety brake system for an internal combustion engine and an implement powered thereby.

Further objects and advantages of the invention will be apparent from the following description.

BRIEF DESCRIPTION OF THE DRAWINGS

FIG. 1 is an elevational view of an engine powered lawn mower having a safety brake system in accordance with the present invention;

FIG. 2 is a perspective view of the lawn mower of FIG. 1, with the engine blower cover removed and particularly showing a portion of the safety brake system;

FIG. 3 is a cross-sectional view of the engine flywheel of the embodiment of FIG. 2, particularly showing a portion of the the safety brake system in one configuration thereof;

DESCRIPTION OF THE PREFERRED EMBODIMENTS

Figure 4:
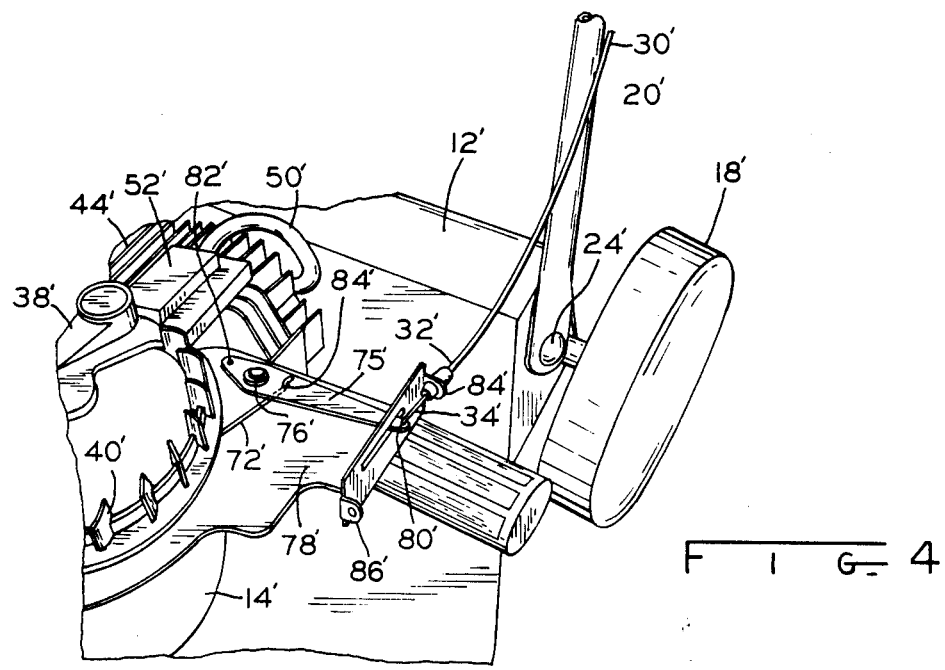
FIG. 4 is a perspective view of an alternative configuration of the lawn mower of FIG. 1, with the engine orientation reversed and the safety brake system in an alternative configuration.

Referring in particular to FIG. 1, there is illustrated a walk-behind lawn mower 10 in accordance with the present invention. Mower 10 includes a deck 12 supporting an air-cooled single-cylinder internal combustion engine 14 having a vertical crankshaft and a horizontally oriented cylinder. Attached to an extension of the crankshaft of engine 14 and disposed below deck 12 is a blade 16. Deck 12 has four wheels 18, one disposed at each corner, rotatably mounted thereto. A push handle 20 including a hand grip portion 22 is affixed to either side of deck 12 proximate the rear end thereof by bolts 24. Proximate hand grip portion 22 is a deadman means comprising a bail handle 26 pivotally attached to push handle 20 at pivot 28. A Bowden cable 30 has its sheath 32 affixed at the upper end thereof to push handle 20 proximate bail handle pivot 28 by retainer 33. The inner wire 34 of cable 30 is attached to bail handle 26 at point 36 such that when bail handle 26 is displaced toward handle grip portion 22 in a clockwise rotation about pivot 28 as viewed in FIG. 1 (as it would be when grasped by an operator of mower 10), inner wire 34 is placed in tension and moved upwardly relative to sheath 32. Such tension and relative movement of wire 34 with respect to sheath 32 is exploited at the lower end of Bowden cable 30, through a further linkage described below in greater detail, to disengage a spring-biased deadman safety brake on engine 14.

Referring to FIG. 2, mower 10 is illustrated in one relatively common arrangement in which the cylinder head extends toward the front of the mower deck, i.e., the spark plug is facing away from the operating position. The blower cover of engine 14 has been removed in FIG. 2 to reveal a flywheel 38 having blower vanes 40 which is attached to the upper end of the vertical crankshaft for rotation therewith about a vertical axis. Cylinder 42 extends horizontally and forwardly relative to the mower deck and has a cylinder head 44 including cooling fins 46 and a spark plug 48 connected by spark plug wire 50 to an electronic ignition module 52 fixed proximate the periphery of flywheel 38.

As is shown most clearly in FIG. 3, flywheel 38 includes an annular ring 54 opening downward and having an inner circumferential braking surface 56. Disposed within ring 54 and fixed to engine 14 is a pivot 58 on which is pivoted a brake lever 60 having affixed thereto a brake pad 62 which has a curved friction surface 64 conforming to the curvature of braking surface 56 of ring 54. A tension spring 66 is fixed at one end 68 to engine 14 and at the other end to brake lever 60 via hole 70 so as to generate a clockwise moment (as viewed in FIG. 3) about pivot 58 acting on lever 60, and thereby urges friction surface 64 of brake pad 62 into frictional engagement with braking surface 56 of ring 54. Since ring 54 rotates with the crankshaft in a clockwise direction (as viewed in FIG. 3), the resultant frictional force acting on brake pad 62 extends along a line passing to the right of pivot 58 (as viewed in FIG. 3), thereby generating a clockwise moment about pivot 58 acting on brake lever 60 which in addition to the moment generated by spring 66 further urges brake pad 62 into frictional engagement with braking surface 56 of ring 54. Since the frictional force acting on brake pad 62 is (within limits) proportional to the force with which brake pad 62 is urged against ring 54, a positive feedback situation occurs in which brake lever 60 becomes self-energizing once braking action is initiated by spring 66. In other words, brake pad 62 is urged against ring 54 under the influence of frictional engagement between friction surface 64 and braking surface 56 with a greater force than is accounted for by the action of spring 66.

Because spring 66 normally biases brake lever 60 into a braking condition, it is necessary during normal operation of mower 10 to maintain brake lever 60 in a position wherein brake pad 62 is disengaged from ring 54 against the bias of spring 66. This is accomplished in the embodiment illustrated in FIGS. 2 and 3 by a disengagement link 72 which is preferably a wire having a hook end or "Z" end engaging a hole 74 located in brake lever 60 such that tension applied to link 72 generates a counterclockwise moment (as viewed in FIG. 3) about pivot 58 acting on brake lever 60, thereby urging brake pad 62 away from and out of engagement with ring 54. Given the placement of the brake lever 60 and pivot 58 relative to engine 14 in the embodiment of FIG. 3, this is accomplished by link 72 running roughly parallel to cylinder 42 and tension being applied thereto in a direction toward cylinder head 44 or spark plug 48, i.e., toward the front of mower deck 12.

In the embodiment of FIG. 2, with the cylinder head extending away from the operating position, the required direction of tension to be applied to link 72, namely forward relative to deck 12, runs counter to the direction in which tension can most straightforwardly be applied by Bowden cable 30, namely rearwardly. Consequently, a reversal of direction is provided by an interface means including a control lever 75 pivotally mounted at pivot 76 to a bracket 78 which is in turn fastened to engine 14. The sheath 32 of cable 30 is affixed at its lower end to bracket 78 and the inner wire 34 of cable 30 is affixed at its lower end to one end of control lever 75 at hole 80. Link 72 is connected to the other end of control lever 75 at hole 82, such that pivot 76 is disposed intermediate attachment holes 80 and 82. As a result of this arrangement, tension applied in a rearward direction relative to mower deck 12 by Bowden cable 30 is reversed by control lever 75 pivoting on pivot 76 so as to apply tension in a forward direction relative to mower deck 12 to link 72, thereby disengaging brake pad 62 from ring 54.

It is sometimes the preference of lawn mower manufacturers to orient the engine oppositely to that shown in FIGS. 2 and 3, i.e., to have the cylinder head or spark plug facing rearward toward the operator. Such an orientation is illustrated in the embodiment of FIG. 4 in which those components which correspond to the embodiment of FIG. 2 are designated by like reference numerals which are distinguished by primes. It should be understood that the individual components of the embodiments of FIGS. 2 and 4 are identical, and that the difference between the embodiments is only in the interconnection and orientation of the individual components. Therefore, reference to a component by either its base reference numeral or its primed reference numeral is to be understood as a reference to a single physical component, with the prime or lack thereof merely specifying which assembly orientation is contemplated. In the orientation of FIG. 4, with the cylinder head extending toward the operating position, the required direction of tension to be applied to link 72′, namely rearward relative to deck 12′, runs in the same direction in which tension can most straightforwardly be applied by Bowden cable 30′, namely rearwardly. Consequently, there is no need to provide a reversal of direction via control lever 75′ as was the case in the previously discussed embodiment. Nevertheless, for the sake of economy of manufacture and to avoid having to produce two otherwise identical engines differing only in the safety brake control mechanism, it would be desirable to provide a single control mechanism which can be used with the engine orientations of both FIGS. 2 and 4. This is accomplished by the present invention, as described below.

Figure 5:
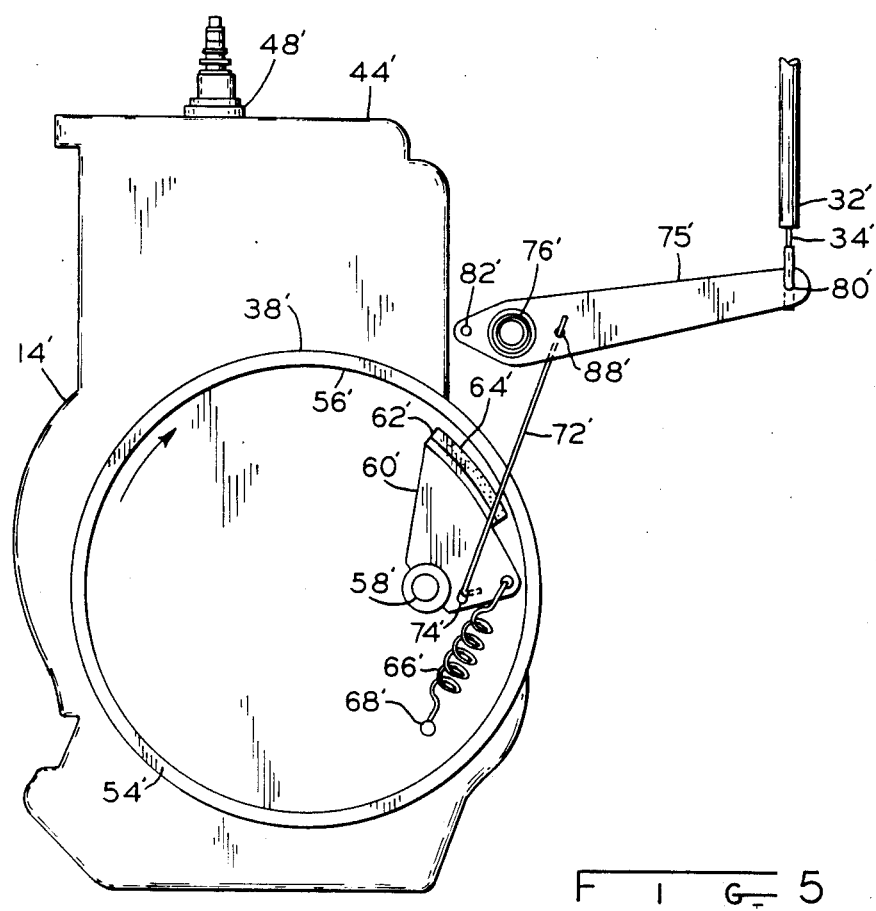
FIG. 5 is a cross-sectional view of the engine flywheel of the embodiment of FIG. 4, particularly showing a portion of the the safety brake system in another configuration thereof.

Referring particularly to FIGS. 4 and 5, the illustrated embodiment is identical to that of FIGS. 2 and 3 with the exception that engine 14 is turned 180 degrees such that cylinder head 44′ faces backward toward the operating position and Bowden cable 30′ approaches engine 14′ from the rear on the left side (from the operator's perspective) rather than on the right side. Link 72′, control lever 75′ and bracket 78′ are identical to their counterparts in the previous embodiment with the only difference being the point of attachment of link 72′ to control lever 75′ and the point of attachment of sheath 32′ of Bowden cable 30′ to bracket 78′. In particular, Bowden cable 30′ is attached to a wing 84′ at an end of bracket 78′ toward cylinder head 44′ whereas Bowden cable 30 (FIG. 2) is attached to a wing 86 at an end of bracket 78 away from cylinder head 44. Bracket 78/78′ of engine 14/14′ is provided with both wings 84/84′ and 86/86′ so that the mower manufacturer need only choose the appropriate one during assembly depending upon which engine orientation has been chosen. Inner wire 34′ of Bowden cable 30′ is attached to control lever 75′ at hole 80′ as in the previous embodiment but link 72′ is attached to hole 88′ in control lever 75′ rather than hole 82′. Hole 88′ is disposed intermediate pivot 76′ and hole 80′ so that tension applied to hole 80′ does not result in a reversal of direction. Consequently, a single control lever 75/75′ can be used in both embodiments which selectively provides either reversal or non-reversal of direction depending upon which hole 82/82′ or 88/88′ is selected to receive link 72/72′. Since the distance between hole 82 and pivot 76 is the same as that between hole 88′ and pivot 76′, the relative lever arm lengths remain the same and thus the mechanical advantage provided by control lever 75/75′ is approximately the same regardless of whether reversal of direction is selected.

While the present invention has been particularly described in the context of preferred embodiments, it will be understood that the invention is not limited thereby. Therefore, it is intended that the scope of the invention include any variations, uses or adaptations of the invention following the general principles thereof and including such departures from the disclosed embodiments&s as come within known or customary practice in the art to which the invention pertains and which fall within the appended claims or the equivalents thereof.

What is claimed is:

1. A safety brake system for an engine comprising:
brake means normally biased in a braking condition for braking rotation of the engine;
disengagement means connected to said brake means and responsive to externally applied force for disengaging said brake means from the braking condition; and
operator interface means for transmitting force from an operator to said disengagement means, said interface means including a pivoted control lever having first and second ends and a pivot located intermediate the first and second ends and an intermediate portion located intermediate the pivot and the second end, the control lever being connected to said disengagement means, and deadman means connected to said control lever and manually operable by the operator for transmitting force to the control lever when so operated, said interface means having alternatively selectable first and second conditions,
said first condition having the first end of the control lever connected to said disengagement means and the second end of the control lever connected to the deadman means, such that force applied to the control lever through the deadman means undergoes a reversal of direction while being transmitted by the control lever to the disengagement means,
said second condition having the intermediate portion of the control lever connected to said disengagement means and the second end of the control lever connected to the deadman means, such that force applied to the control lever through the deadman means does not undergo a reversal of direction while being transmitted by the control lever to the disengagement means.

2. The safety brake system of claim 1, in which said deadman means includes a Bowden cable attached at one end thereof to the control lever.

3. The safety brake system of claim 2, in which said deadman means includes a deadman safety lever attached to said Bowden cable at the other end thereof, the deadman safety lever being grasped by the operator during normal operation of the engine.

4. The safety brake system of claim 3, in which the Bowden cable has a sheath and an inner wire, the sheath being fixed relative to the engine and the deadman safety lever, the inner wire being connected to the control lever and to the deadman safety lever so as to transmit force in tension from the operator to the control level.

5. The safety brake system of claim 4, in which in said first and second conditions the control lever is connected to said disengagement means through a link which acts in tension in opposition to the bias of said brake means.

6. The safety brake system of claim 5, in which said control lever includes a first link engaging means at the first end for engaging said link and a second link receiving means at the intermediate portion for engaging said link, said first and second link engaging means being approximately opposite one another on each side of the pivot, said first and second link engaging means alternatively engaging the link in said first and second conditions.

7. The safety brake system of claim 6, in which said first and second link engaging means are approximately equidistant from the pivot.

8. The safety brake system of claim 5, in which said control lever includes a first hole through the first end and a second hole through the intermediate portion, said first and second holes being approximately opposite one another on each side of the pivot, said first and second holes alternatively receiving the link in said first and second conditions.

9. The safety brake system of claim 8, in which said first and second holes are approximately equidistant from the pivot.

10. The safety brake system of claim 8, in which said control lever pivot is connected to a bracket mounted on the engine, the bracket having alternative first and second means for alternatively receiving the sheath of the Bowden cable in said first and second conditions.

11. A powered equipment apparatus having a safety brake system comprising:
   an engine;
   support means for said engine;
   a rotary implement in driven engagement with said engine;
   handle means connected to said support means and operable by an operator of the equipment;
   brake means normally biased in a braking condition for braking rotation of the rotary implement;
   disengagement means for disengaging said brake means from the braking condition, said means including a link connected to said brake means and actuable in tension; and
   operator interface means for transmitting tension from an operator to said link, said interface means including a pivoted control lever pivotally fixed at least indirectly to said brake means and having first and second ends and a pivot located intermediate the first and second ends and an intermediate portion located intermediate the pivot and the second end, the control lever being connected to said link, a Bowden cable having an inner wire connected to said control lever, and a deadman safety lever connected to said handle means and graspable by the operator during operation of the equipment and connected to apply tension to the inner wire of the Bowden cable when so grasped, said interface means having alternatively selectable first and second conditions,
   said first condition having the first end of the control lever connected to said link and the second end of the control lever connected to the Bowden cable, such that tension applied to the control lever through the Bowden cable undergoes a reversal of direction while being transmitted to the link,
   said second condition having the intermediate portion of the control lever connected to said link and the second end of the control lever connected to the Bowden cable, such that tension applied to the control lever through the Bowden cable does not undergo a reversal of direction while being transmitted to the link.

12. The safety brake system of claim 11, in which the Bowden cable has a sheath fixed relative to the brake means and to the deadman safety lever.

13. The safety brake system of claim 12, in which said control lever includes a first hole through the first end and a second hole through the intermediate portion, said first and second holes being approximately opposite one another on each side of the pivot, said first and second holes alternatively receiving the link in said first and second conditions.

14. The safety brake system of claim 13, in which said first and second holes are approximately equidistant from the pivot.

15. The safety brake system of claim 13, in which said control lever pivot is connected to a bracket mounted on the engine, the bracket having alternative first and second means for alternatively receiving the sheath of the Bowden cable in said first and second conditions.

* * * * *